US007784776B2

(12) United States Patent
Pechtl et al.

(10) Patent No.: US 7,784,776 B2
(45) Date of Patent: Aug. 31, 2010

(54) TRANSPORT SUPPORT APPARATUS FOR TRANSPORT OF OBJECTS ALONG A TREATMENT PATH AND METHOD FOR CENTERING OBJECTS IN TRANSPORT SUPPORTS

(75) Inventors: Klaus Pechtl, Stadtschwarzach (DE); Rainer Endres, Karsbach-Hollrich (DE)

(73) Assignee: KBA-Metronic AG, Veitshochheim (DE)

( * ) Notice: Subject to any disclaimer, the term of this patent is extended or adjusted under 35 U.S.C. 154(b) by 514 days.

(21) Appl. No.: 11/673,454

(22) Filed: Feb. 9, 2007

(65) Prior Publication Data

US 2007/0183884 A1 Aug. 9, 2007

(30) Foreign Application Priority Data

Feb. 9, 2006 (DE) ...................... 10 2006 006 231

(51) Int. Cl.
*B23Q 16/00* (2006.01)

(52) U.S. Cl. ................. 269/50; 414/222.04; 198/345.1; 269/234

(58) Field of Classification Search ............ 414/222.04, 414/222.05, 222.06, 434, 648, 658, 910, 414/941; 198/373, 375, 388, 345.1, 345.2, 198/345.3, 346, 346.1, 346.2; 269/47, 49–52, 269/234

See application file for complete search history.

(56) References Cited

U.S. PATENT DOCUMENTS 5,086,904 A * 2/1992 Yasutake ................ 198/346.1
5,374,159 A * 12/1994 Severns et al. .............. 414/806
5,637,200 A * 6/1997 Tsymberov ............ 204/298.15

FOREIGN PATENT DOCUMENTS

DE 69716295 T2 10/1999
WO WO 01/17860 A1 3/2001
WO WO 02/057140 A1 7/2002

OTHER PUBLICATIONS

Attachment A—German Search Report stamped Sep. 18, 2006.

* cited by examiner

*Primary Examiner*—Donald Underwood
(74) *Attorney, Agent, or Firm*—Chadbourne & Parke LLP; Walter G. Hanchuk

(57) ABSTRACT

The invention concerns a transport support for transport of at least one object along the transport path through at least one processing station, and can include transport of at least one printable object along the transport path for printing of a printable object, in which the transport support includes a device by means of which the object can be aligned in the desired position relative to the transport support. The invention also concerns a method for alignment, including centering, of at least one object of a transport support, by means of which at least one object is transported along a transport path to/through at least one processing station, in which the object can be aligned by a device provided in the transport support into a desired position relative to transport support.

24 Claims, 5 Drawing Sheets

TRANSPORT SUPPORT APPARATUS FOR TRANSPORT OF OBJECTS ALONG A TREATMENT PATH AND METHOD FOR CENTERING OBJECTS IN TRANSPORT SUPPORTS

RELATED APPLICATION(S)

Applicants hereby claim priority under 35 USC §119 for German patent application no. 10 2006 006 231.0 filed Feb. 9, 2006, entitled "TRANSPORTTRÄGER ZUM TRANSPORT VON OBJEKTEN ENTLANG EINES BEHANDLUNGSWEGES UND VERFAHREN ZUR ZENTRIERUNG VON OBJEKTEN IN TRANSPORTTRÄGERN," incorporated by reference herein.

FIELD OF THE INVENTION

The invention concerns a transport support for transport of at least one object along a transport path through at least one processing station, and can include transport of at least one printable object along a transport path for printing of a printable object. The invention also concerns a method for centering objects, including printable objects on a transport support, by means of which at least one object is transported to or through processing stations, e.g., printing stations.

BACKGROUND

Such transport supports are used in order to support any type of object to processing stations, in order to process the objects along a transport path. Typical applications, for example, can be seen in a printing machine, in which, by means of a transport support in this application, at least one printable object is transported, in order to feed it to individual stations for processing. Processing stations can be printing units (rotary printing, screen printing, etc.), as well as processing stations for curing of paints, checking of imprints, stations for insertion of printable objects into the transport supports, and also removal from them, etc.

SUMMARY

According to one aspect of the invention there is provided a transport support and method, with which it is possible to align objects positioned on a transport support distinctly in a desired position, including a reference position on the transport support, regardless of whether the transport support moves along a transport path during alignment of an object or stands still at one position of the transport path. It is another aspect o the invention also to support removal of the processed objects from a transport support.

According to another aspect of the invention, a transport support includes a device, by means of which the object can be aligned in a desired position (reference position) relative to the transport support.

According to a further aspect of the invention, a transport support itself includes the device, by means of which alignment of an object on a transport support occurs. According to this aspect of the invention, alignment can occur during movement of the transport support along its transport path. Time-consuming downtimes are therefore avoided and a completely continuous movement process during processing of the objects in the individual stations can be achieved, or at least a reduction in stopping zones can be achieved.

According to a still further aspect of the invention, during transport, if desired or required, additional alignment can occur essentially at any time, since the device required for this is carried by the transport support. In one possible variant, it can be prescribed that the device have at least one positioning element that can be moved into an opening/recess of an object being aligned.

In accordance with this aspect of the invention, an object arranged in the transport support can be aligned into a desired position, for example, a centered position, relative to the transport support by means of this positioning element. For this purpose, a positioning element can be moved into an opening/recess of an object, from below, through a recess in a support surface for the object.

If the cross-section of a positioning element and an opening/recess correspond to each other, possibly except for the size and relative position, an opening/recess is centered by the insertion movement or by an additional action carried out around the positioning element after insertion, so that the object is aligned in the desired position.

For this purpose, depending on the object, it could be prescribed to provide one or several positioning elements, depending on how many openings/recesses are provided on the object for positioning. In particular, in optical data carriers, like CDs, DVDs and the like, which have a central hole, only one positioning element can be prescribed, which is also arranged centered in a support surface adapted to the cross-sectional surface of the data carrier.

For this purpose, in one variant, a positioning element can be designed as a centering mandrel that can be moved into an opening/recess of an object being positioned, and by means of which the position of the opening/recess, relative to the centering mandrel, can be centered already by the introduction movement. In another variant, the upper end of a positioning element can have expansion jaws that can be expanded outward, which can be expanded after insertion of the positioning element into the opening/recess.

An example embodiment can be described, in terms of design, that a positioning element be movable perpendicular to a support surface of the transport support provided for the object, including in which a positioning element can be moved from the bottom through a recess into a support surface in an opening/recess of an object lying on the support surface.

For example, a positioning element can be designed as a pin, for example, which is arranged with its longitudinal axis perpendicular to the support surface in the transport support. For example, the positioning element can be mounted to move in its longitudinal direction, for example, by friction bearings, in which the possible end positions of the positioning element can be defined by stops that limit the movement path.

A positioning element can be controlled in at least two different positions. Control can be provided internally in a transport support or externally in the form of a purely mechanical drive.

In one variant, an upper end of the positioning element can be arranged in a first position, e.g., a rest position, beneath a surface of a support surface for an object. In accordance with this aspect of the invention, an object can be placed on the support surface of the transport support without the interference of a positioning element. The upper end of a positioning element can engage in an opening/recess of an object in a second position, for example, an alignment position, and align the object in so doing. One or more intermediate positions can also be traversed between these positions.

In the aforementioned variant as a centering mandrel, the upper end of a positioning element can taper upward, so that the upper end has a cross-section, e.g., a diameter that is smaller than the cross-section, e.g., the diameter of an opening/recess on an object. Such a positioning element will therefore find the path into an opening/recess of an object even with an object originally placed imprecisely on the support surface, at least with the tip of the upper end. An upper end of a positioning element can be designed as a cone or half-cone or sphere.

A positioning element can have a cross-section at a distance from the upper end, e.g., a diameter that is greater than the cross-section, e.g., the diameter of an opening/recess on an object. In accordance with this aspect of the invention, during insertion of the positioning element into the opening/recess, an object is raised from a support surface from a certain movement width.

In accordance with this aspect of the invention, raising produces alignment, both for any further processing, e.g., at the beginning of the transport path, but also centering, if an object is raised at the end of the transport path from a support surface by this mechanism, so that an object can be transferred more easily, more precisely and more reliably to a gripper system for removal of the object from the support surface.

Through this lifting, any adhesion force between the object and support surface can be overcome, including, for example, when the support surface has openings, in which a partial vacuum can be produced, in order to cause firm suction of an object on the support surface.

After initial centering, the object can then be lowered onto the support surface by a return movement of the positioning element, in which case an object is firmly attached by suction in the centered position by means of partial vacuum on the support surface, that can be at the same time.

According to an aspect of the invention, at certain points along a transport path e.g., at the beginning, if necessary, at the end and potentially between the beginning and the end at discrete points the allocation of an object to the transport support is to take place. For this, the movement of a positioning element and/or the expanding jaws can be controlled during movement, for example, through the movement of a transport support along its respective transport path. For example, a positioning element can exhibit a lower end, which slides, at least in a partial area of the transport path during the movement of the transport support, over a control cam.

In accordance with an aspect of the invention, the lower and upper end are stationary with respect to one another due to the positioning element, and the upper end can conduct a movement, which corresponds to the movement of the lower end over the control cam. As such, the movement of the positioning element can be preset by the control cam in a simple manner. Here, it is advantageous, if the positioning element is pushed together with its lower end through a spring press in the direction of the control cam. In a similar manner, a positioning element can have a control pin to control the expanding jaws, insofar as they are prescribed.

In accordance with a further aspect of the invention, moving a positioning element into an opening/recess of an object can not only occur when an object is already lying on the support surface, but also when an object is, together with its opening/recess, set on a positioning element deployed from the support surface by means of a gripping system, such that the centering occurs directly during the positioning process. As a result, the object is correctly aligned to the transport support directly after the gripping system releases, but has not yet been set on top of it, which may then subsequently take place.

In accordance with a further aspect of the invention, before positioning of an object on the support surface by return movement of a positioning element, the positioning element can be initially moved into a transient position, in which the object has a more limited spacing to the support surface than during positioning on the positioning element. Because of this, any wobbling of the object, for example, a CD/DVD, before complete positioning and possible partial vacuum suction onto the support surface is suppressed, the object itself can be stabilized by stops on its outer periphery on the support surface during wobbling.

In accordance with a further aspect of the invention, a support surface can be designed, for example, to be circular, in which case a positioning element is arranged in the center of a support surface. The reference position is then dictated by the center, i.e., the center axis, of a positioning element with a round cross-section. The transport support according to the invention can have several such support surfaces, each with a positioning element.

DETAILED DESCRIPTION

Figure 1A:
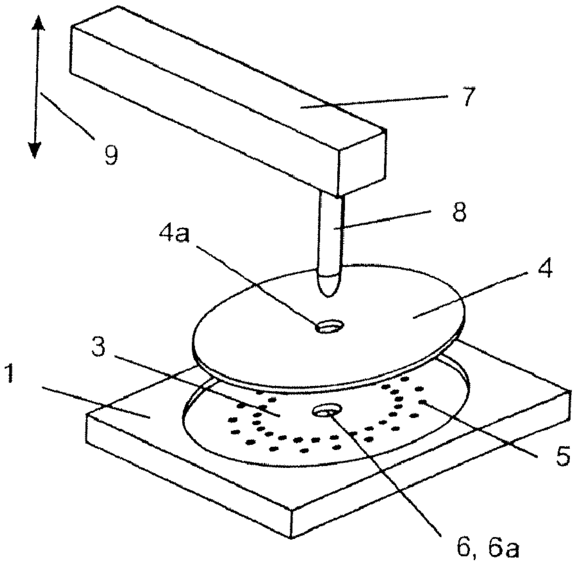
Figure 1a PRIOR ART
FIGS. 1a to 1c: show an example according to the prior art for centering of a CD/DVD on a support surface of the transport support.
Figure 1B:
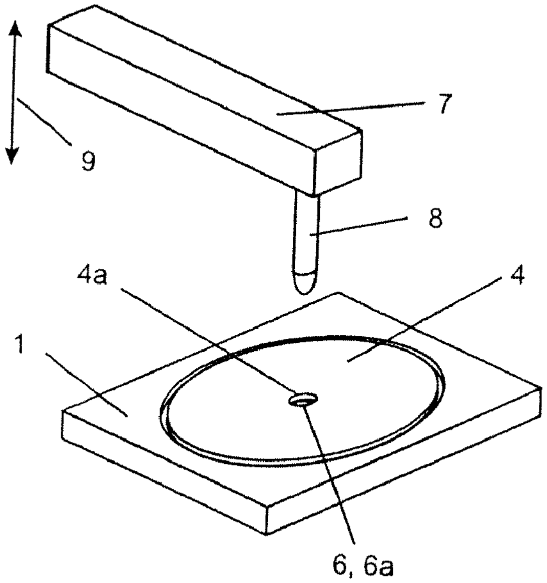
Figure 1b PRIOR ART
Figure 1C:
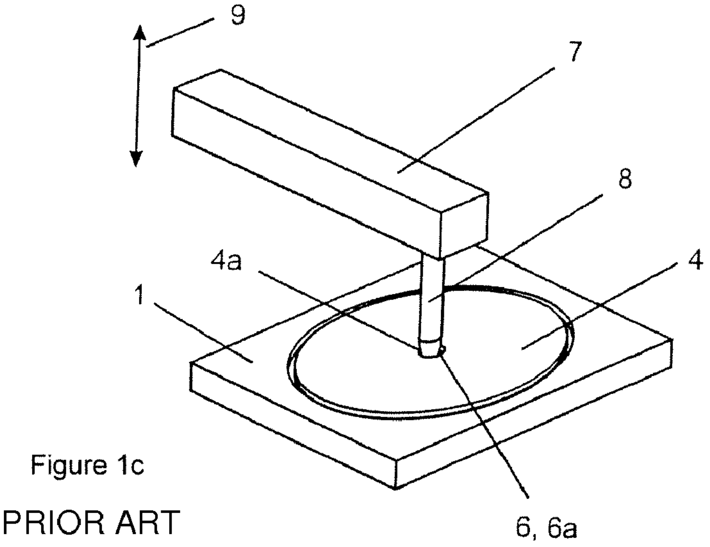
Figure 1c PRIOR ART

FIGS. 1a to 1c schematically depict a transport support 1 of the known type, in which a base element has one or more receiving surfaces 3 for the objects being printed, like CDs or DVDs 4. FIG. 1a shows a transport support 1 with a still not positioned data carrier and a schematic centering unit.

FIG. 1b shows the transport support 1 with the position data carrier 4 and FIG. 1c shows the transport support 1 with the position data carrier 4 during centering via the centering device 7.

The functions and properties of variants according to the various aspects of the invention will be described below by means of CDs, for example and without restriction of the general applicability of the various aspects of the invention to other printable objects.

Referring to FIGS. 1a to 1c, in each of the support surfaces 3 of the transport support 1, several openings 5 can be situated, which are connected via channels (not shown) and controllable valves (not shown) to a vacuum supply (not shown), so that a CD 4 lying on a support surface 3 can be secured after switching on the vacuum.

The geometric arrangement of openings 5 essentially corresponds to the shape of the CD 4 being printed and is also chosen, so that during positioning of the CD 4 being printed, all openings 5 are covered and the most uniform possible force distribution on the CD 4 is achieved and the most optimal possible holding effect of the CD 4 on the support surface 3 is achieved when the vacuum is switched on.

Centering of CD 4 at the center point 6 of support surface 3 or another reference point on the transport support 1 then occurs with an external device 7, for example, a centering mandrel 8 movable along a vertical movement direction 9 here, which carries out centering via the center hole 4*a* of CD 4 after or during positioning of CD 4 on the support surface 3 of the transport support 1 and before switching on of the vacuum for securing the CD 4 on the support surface 3.

The centering mandrel 8, as schematically depicted in FIG. 1*c*, is moved along the movement direction 9 from a rest position above support surface 3 into a centering position, in which the centering mandrel 8 engages through the center hole 4*a* of CD 4 in a recess 6*a* on the transport support and therefore centers CD 4 relative to axis 6. With this type of centering, the transport support must stop.

Figure 2A:
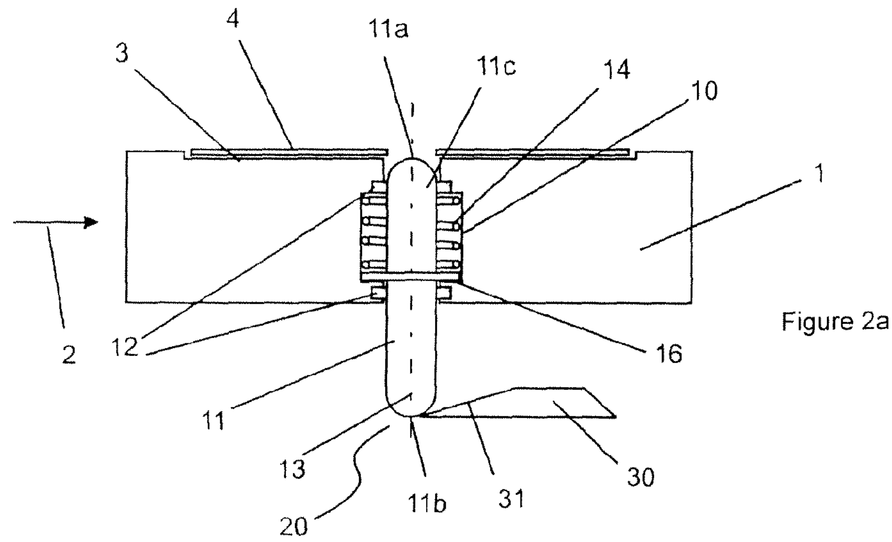
FIGS. 2a to 2c: show the centering process of a CD/DVD according to one aspect of the invention.
Figure 2B:
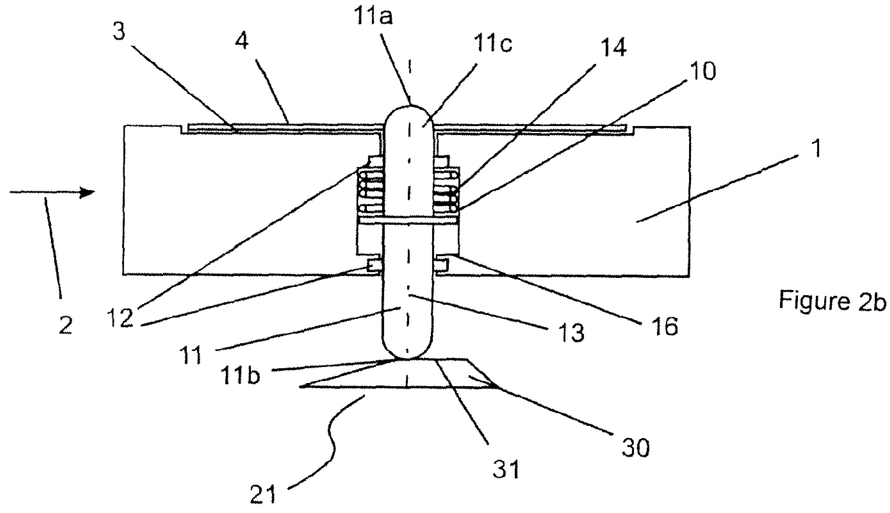
Figure 2C:
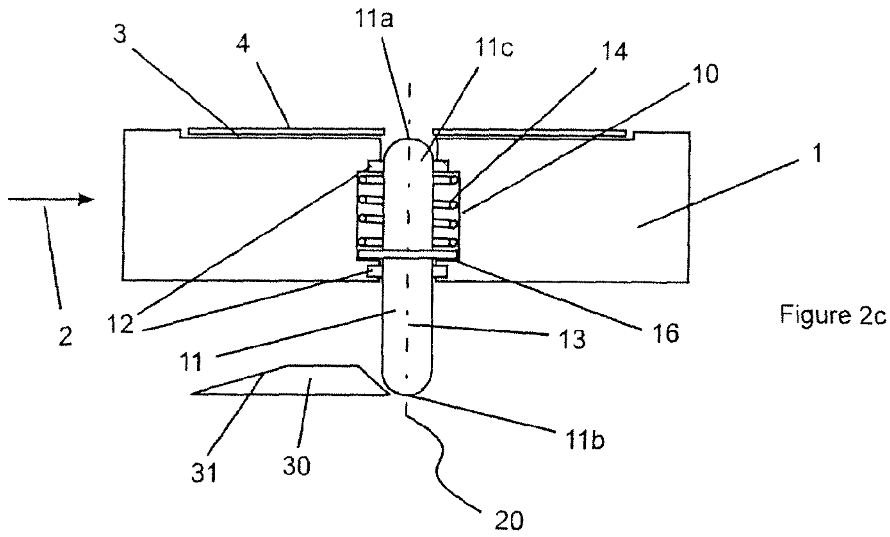

FIGS. 2*a* to 2*c* show a variant of CD centering according to an aspect of the invention at different times. A hole 10 is situated in the center of support surface 3 in the transport support 1, in which a centering pin 11 is mounted movable as a positioning element via bearing 12. The centering pin 11 is biased by a spring 14 and can be moved along axis 13, i.e., perpendicular to the support surface, during which the movement is limited on the top and bottom with stops 16. Centering pin 11, as shown in FIG. 2*a*, then lies in a rest position 20, so that the upper end 11*a* of the centering pin 11 lies beneath the support surface 3, so that this end does not hamper printing (not shown) of a CD 4 lying on the support surface 3.

In the position depicted in FIG. 2*b*, the centering pin 11 moves into an upper position 21, in which it centers a CD 4 lying on the support surface 3 through its center hole 4*a* relative to axis 13. Movement of the centering pin into the centering position 21 can then occur by means of fixed cams 30, whose surface forms the aforementioned control cam. The transport support 1 is moved here along the transport path 2, during which the lower end 11*b* of the centering pin 11 slides over the surface 31 of cam 30 and, according to the shape of cam 30, forces the centering pin 11 from a rest position 20 upward from the support surface 3 into the centering position 21. Since the centering pin 11 is biased by spring 14, the lower end 11*b* always follows the surface shape 31 of cam 30 and the centering pin 11, after centering is completed and after return of cam 30 back to the rest position 20, is moved, as shown in FIG. 2*c*.

For more precise explanation, the process of CD positioning and centering, up to the beginning of printing, is described below. Since CDs and DVDs, during the manufacturing process, are stacked on spindles, separation occurs by means of a gripper system (not shown here), so that the CDs are moved by means of a vacuum suction element from the spindle to the positioning surface 3 and positioned there. Since, at this point, precise positioning of the CD 4 on the support surface 3 is still not essential either with the required positioning accuracy or repetition accuracy, this process can occur according to the invention during a continuous movement of transport support 1.

After positioning CD 4 on support surface 3, the CD 4 initially lies on the support surface 3 without fastening by the mentioned vacuum. On the further path of transport support 1 along transport path 2, the lower end 11*b*, as shown in FIG. 2*a*, reaches the surface 31 of the fixed cam 30 and the centering pin 11 is pushed from its rest position 20 in the direction of the centering position 21, as shown in FIG. 2*b*.

Owing to the fact that the upper end 11*c* of the centering pin 11 is designed conical, hemispherical, or spherical here, the tip 11*a* of the upper end 11*c* enters the area of the middle hole 4*a* and centers the CD 4 relative to axis 13 of the centering pin 11. The diameter of the centering pin 11 beneath the upper end 11*c* is then chosen somewhat larger than the maximum diameter of the center hole 4*a* of CD 4.

The stroke of centering pin 11 is also chosen, so that the CD 4 with the completely deployed centering pin 11 is raised somewhat from support surface 3 and only lies on the centering pin 11 via the center hole 4*a* and is therefore completely centered relative to axis 13. At this point, the mentioned vacuum is switched on, so that the CD 4 is drawn by suction onto the support surface 3 and therefore lies fastened on the support surface 3.

Simultaneously with engagement of the vacuum, the centering pin 11 is lowered again over the surface shape 31 of cam 30 into its rest position 20, as shown in FIG. 2*c*. Adjustment of the stroke movement and the starting point of deployment of the cam can expediently occur by means of one or several adjustment units on cam 30 (not shown).

In another variant, as shown in FIGS. 3*a* to 3*d*, the CD 4, during the positioning process, is not positioned directly on the support surface 3, but on the centering pin 11 deployed at this point, so that the CD 4 is already centered relative to axis 13 at this time.

Figure 3B:
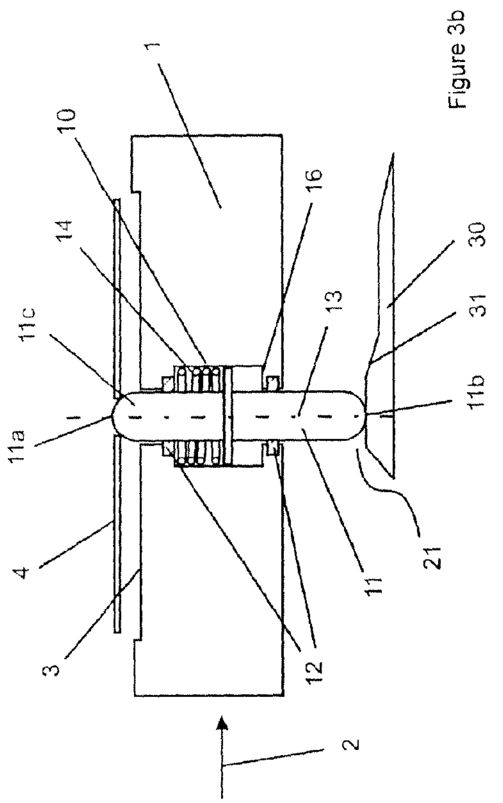
FIGS. 3a to 3d: show positioning of a CD directly on a positioning element and subsequent positioning on the support surface in accordance with one aspect of the invention.
Figure 3D:
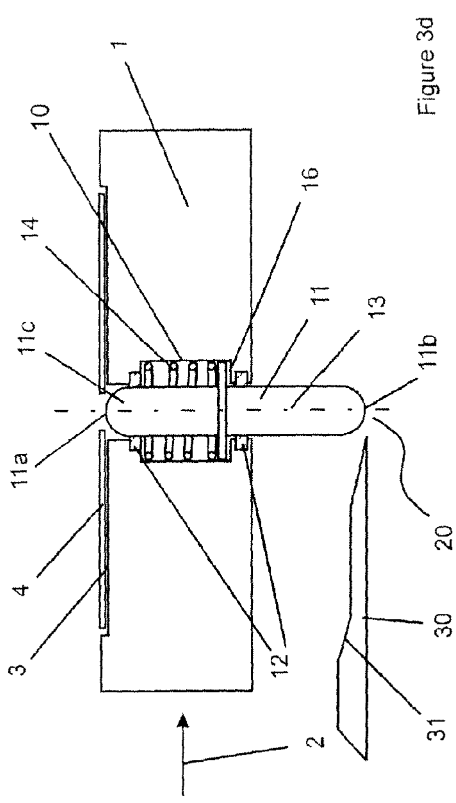
Figure 3A:
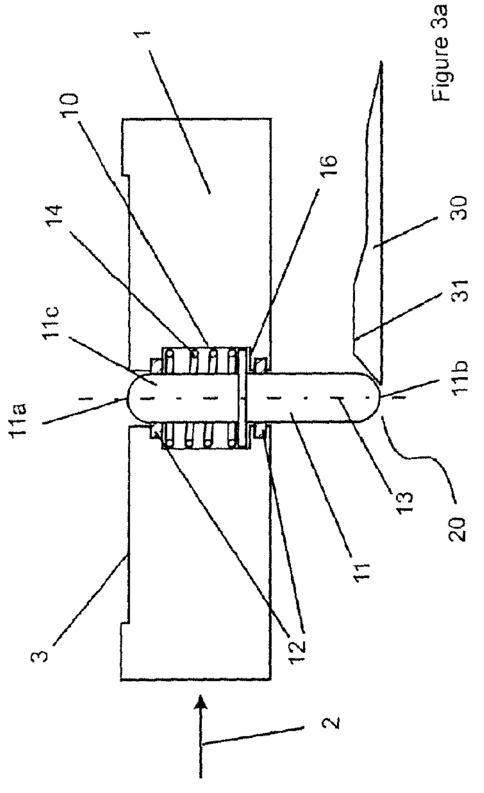

FIG. 3*a* then shows the transport support 1 without the positioned CD right before the beginning of the positioning process. At this point, the centering pin 11 is situated in the rest position 20, as already described. During further movement of the transport support 1 along the movement direction 2, the lower end 11*b* of the centering pin 11 reaches the surface 31 of cam 30 and is forced accordingly into a receiving and centering position 21.

A CD is positioned in this position by means of the mentioned gripper system onto the upper end 11*c* of the centering pin and the CD is centered relative to axis 13 on this account, as shown in FIG. 3*b*.

Figure 3C:
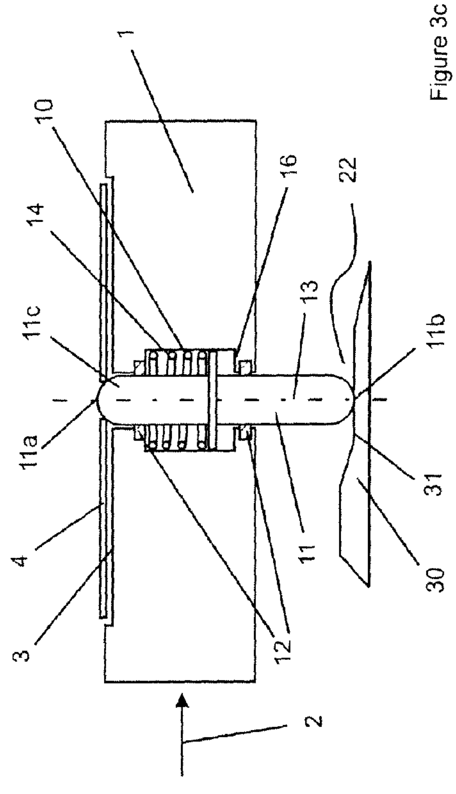

It can be expedient to move the centering pin 11 during the positioning process by a corresponding design of the surface 31 of cam 30 from the aforementioned centering position 21 initially into a transient position 22, in order to compensate for wobbling of the CD 4 during positioning, as shown in FIG. 3*c*. At this point, the mentioned vacuum can already be switched on, so that the CD 4 is already fastened on the surface 3 of the transport support by the vacuum during further lowering of the centering pin 11 into the rest position 20, as shown in FIG. 3*d*.

Figure 4A:
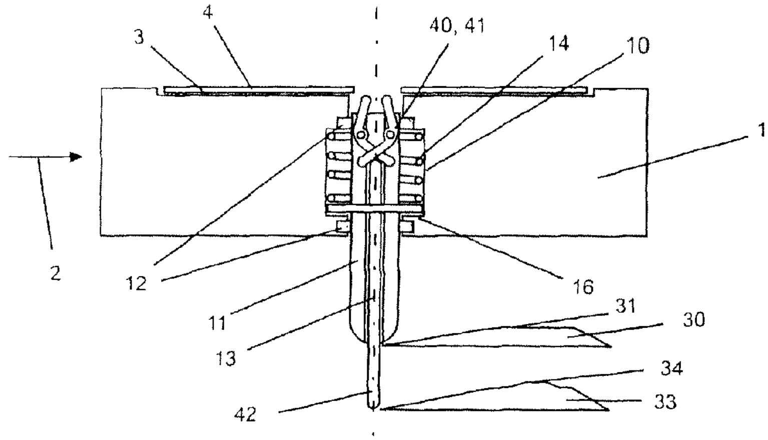
FIGS. 4a to 4c: show a variant as in FIG. 2, but with expansion jaws on the upper end of the positioning element in accordance with one aspect of the invention.
Figure 4B:
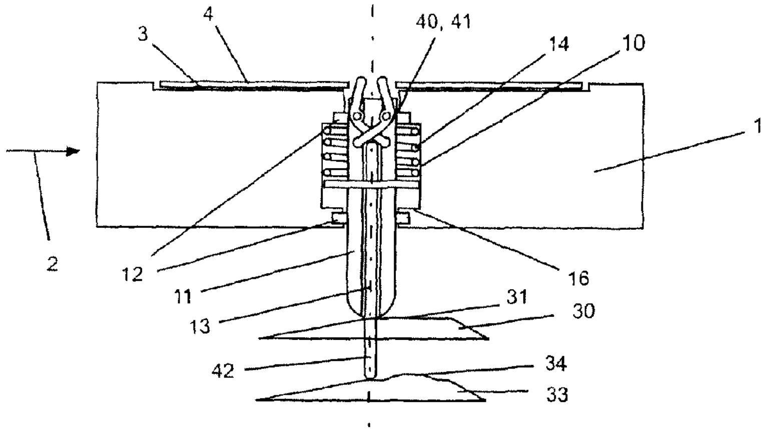
Figure 4C:
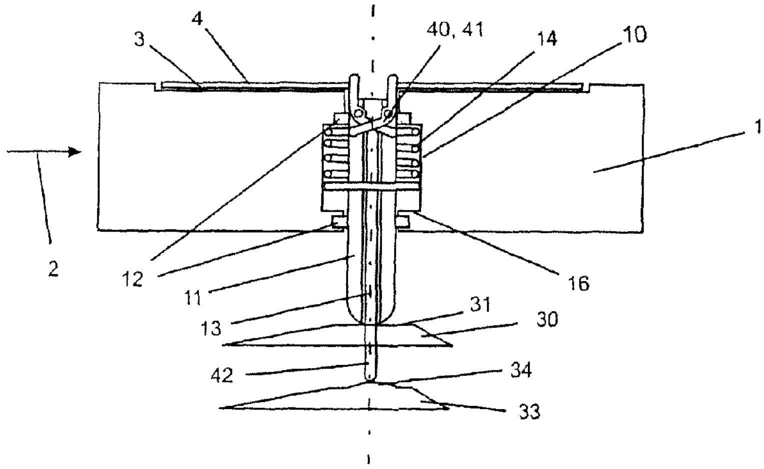

The centering pin 11, in an alternative variant, as shown in FIGS. 4*a* to 4*c*, can also be designed on its upper end as a controlled expansion mandrel 40 with expansion jaws 41, instead of the mentioned conical/hemispherical design, which, during operation of a lifting rod 42, centers CD 4 relative to axis 13 by an axisymmetric expansion of its expansion jaws 41 as soon as the centering pin 11 is situated in the centering position. In this case, an additional cam 33 exists with a surface 34, via which the lifting rod 42 operates.

Figure 5:
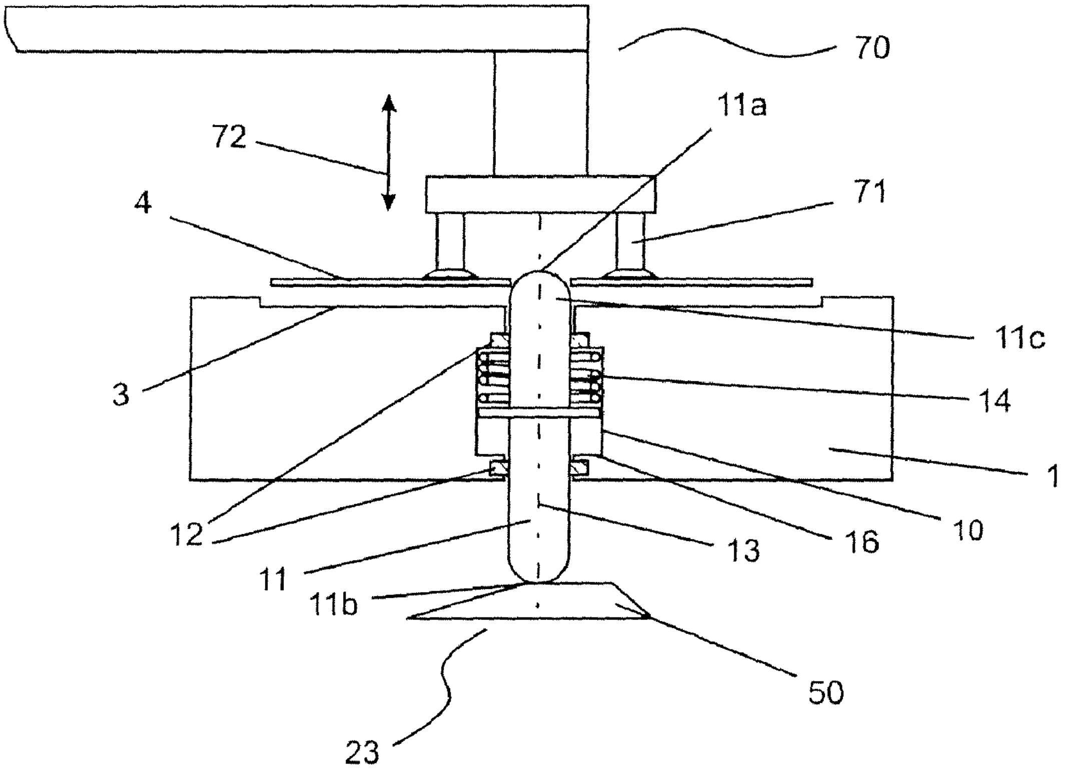
FIG. 5: shows lifting of the CD/DVD from the transport support in accordance with one aspect of the invention.

According to another variant of the invention, as shown in FIG. 5, the transport support according to the invention can assume an additional function, in which the centering mandrel 11, after conclusion of printing, exerts a support function during removal of the CD 4 from the support surface 3 of transport support 1.

After printing, the transport support 1, with the printed CD 4, goes to a removal position on its transport path 2, at which a gripper system 70 grips the CD 4, lying on the support surface 3 of the transport support 1 from the top, for example by means of vacuum suction devices 71, in similar fashion as during positioning of CD 4 on the transport support 1, and releases it from the support surface 3 by means of a lifting movement 72. At this point or right beforehand, the vacuum that fastens the CD 4 to the support surface 3 is switched off and the centering pin 11 is pushed, by means of a fixed cam 50, into a position 23, in which the CD 4 is raised from the support surface 3 and still only lies on the outer surface of the upper end 11*c* of centering mandrel 11 with the inside edge of the center hole 4*a*.

Since the CD 4 is simultaneously held from the top by means of the discussed gripper system 70, by means of vacuum suction devices 71, jumping out of the CD 4 from the support surface 3, because of the holding effect of the centering mandrel 11 in center hole 4*a* of CD 4, is not possible, and the CD 4 is simultaneously grasped with high positioning accuracy and repetition accuracy by the gripper system 70.

Positioning of the CD 4 so grasped onto a positioning spindle provided for this purpose (not shown) occurs in known fashion, in which, because of the precise removal of CD 4 from the transport support 3 according to the invention, essentially increased reliability is achieved during positioning on the spindle.

The invention claimed is:

1. A transport support apparatus for transport of an object along a transport path through a processing station, comprising:

a transport support including a device for aligning an object in a desired position relative to the transport support, wherein the aligning device comprises a positioning element that is moved into an opening of the object being aligned, wherein movement of the positioning element is controlled by movement of the transport support along its transport path and wherein the positioning element has a lower end, which slides, at least in a partial area of the transport path during movement of the transport support, over an adjustable control cam to control the movement of the positioning element.

2. The transport support apparatus according to claim 1, wherein the positioning element is designed as a centering pin which is moved into an opening of the object being positioned, and wherein the position of the opening is centered relative to the centering pin.

3. The transport support apparatus according to claim 1, wherein an upper end of the positioning element has outward-expandable expansion jaws.

4. The transport support apparatus according to claim 1, wherein the positioning element is moved perpendicular to a support surface provided for the object and the positioning element is moved from below through an opening in the support surface into the opening of the object lying on the support surface.

5. The transport support apparatus according to claim 1, wherein the support surface is designed essentially circular for positioning of the object in a shape of a circular disk in which the positioning element is arranged centered in the support surface.

6. The transport support apparatus according to claim 1, wherein the positioning element is controlled in at least two different positions.

7. The transport support apparatus according to claim 6, wherein an upper end of the positioning element is arranged in a first position, beneath top of the support surface for the object.

8. The transport support apparatus according to claim 6, wherein an upper end of the positioning element engages in a second position, in the opening of the object and aligns the object.

9. The transport support apparatus according to claim 1, wherein an upper end of the positioning element tapers upward so that the upper end has a diameter that measures smaller than the diameter of the opening in the object.

10. The transport support apparatus according to claim 9, wherein the positioning element has a diameter at a distance from the upper end that is greater than the diameter of the opening of the object so that the object can be raised with a positioning element inserted into the opening from the support surface.

11. The transport support apparatus according to claim 1, wherein an upper end of the positioning element is designed to be conical.

12. The transport support apparatus according to claim 1, wherein an upper end of the positioning element is designed to be hemispherical.

13. The transport support apparatus according to claim 1, wherein an upper end of the positioning element is designed to be spherical.

14. The transport support apparatus according to claim 3, wherein movement of the expansion jaws of the positioning element is controlled during movement, by the movement of the transport support along its transport path.

15. The transport support apparatus according to claim 14, wherein the positioning element has a control pin to control the expansion jaws, which slides, at least in a partial area of the transfer path during the movement of the transport support, over an adjustable control cam.

16. A method for alignment of an object in a transport support comprising:

transporting the object along a transport path through at least one processing station;

aligning the object by a device comprising a positioning element provided on the transport support into a desired position relative to the transport support;

raising the object from a support surface of the transport support, and centering the object to transfer it in the centered position to a gripper system for removal of the object during movement of the positioning element into an opening of the object.

17. The method according to claim 16, further comprising:

aligning the object in a desired position relative to the transport support, by moving the device comprising the positioning element, which is arranged in the transport support at the bottom, through an opening in the support surface for the object into the opening of the object.

18. The method according to claim 16, further comprising:

positioning the object on the transport support during movement of the transport support.

19. The method according to claim 16, further comprising during aligning:

raising the object from the support surface of the transport support, and centering the object for printing treatment during movement of the device comprising the positioning element into the opening of the object.

20. The method according to claim 19, further comprising after aligning:

lowering the object onto the support surface by return movement of the positioning element, and securing the object by suction in the centered position by a partial vacuum on the support surface.

21. The method according to claim 20, further comprising:

gripping the object for removal by a gripper system, lifting the gripped object from the support surface, and switching off the partial vacuum before or during the lifting the object from the support surface.

22. The method according to claim 16, further comprising:

lowering the object onto the support surface;

centering the object on the support surface by return movement of the positioning element; and securing the object by suction in the centered position by a partial vacuum on the support surface.

23. The method according to claim 16, further comprising:

gripping the object for removal by the gripper system, lifting the gripped object from the support surface, and switching off partial vacuum before or during the lifting of the object from the support surface.

24. The method according to claim 16, wherein an object in the form of a circular disk is used as the object with the opening.

* * * * *